United States Patent
Saborit et al.

(10) Patent No.: US 8,005,868 B2
(45) Date of Patent: Aug. 23, 2011

(54) SYSTEM AND METHOD FOR MULTIPLE DISTINCT AGGREGATE QUERIES

(75) Inventors: Josep Aguilar Saborit, Markham (CA); Miroslaw Adam Flasza, Pickering (CA); Mokhtar Kandil, Toronto (CA); Serge Philippe Rielau, Greenwood (CA); David C. Sharpe, Oakville (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 12/044,348

(22) Filed: Mar. 7, 2008

(65) Prior Publication Data

US 2009/0228433 A1  Sep. 10, 2009

(51) Int. Cl.
*G06F 7/00* (2006.01)
*G06F 17/00* (2006.01)
*G06F 9/26* (2006.01)
*G06F 17/20* (2006.01)

(52) U.S. Cl. ......... 707/796; 707/602; 711/216; 715/213

(58) Field of Classification Search ........... 707/999.002, 707/999.003, 999.005, 796, 706; 709/226; 711/216; 715/213
See application file for complete search history.

(56) References Cited

U.S. PATENT DOCUMENTS

| | | | |
|---|---|---|---|
| 6,275,818 B1 | 8/2001 | Subramanian et al. | |
| 7,636,703 B2 * | 12/2009 | Taylor | 706/62 |
| 2004/0117356 A1 * | 6/2004 | Chen et al. | 707/3 |
| 2005/0021758 A1 * | 1/2005 | White | 709/226 |
| 2008/0147599 A1 * | 6/2008 | Young-Lai | 707/2 |
| 2008/0313132 A1 * | 12/2008 | Hao et al. | 707/2 |
| 2009/0182726 A1 * | 7/2009 | Wang | 707/5 |
| 2010/0098081 A1 * | 4/2010 | Dharmapurikar et al. | 370/392 |

OTHER PUBLICATIONS

Xueqing Gong, et al.; "Bloom Filter-based XML Packets Filtering for Millions of Path Queries"; http://wwwcs.uni-paderborn.de/cs/ag-boettcher/lehre/SS05/sem-ss05/iCDE2005.pdf.

P. Ferragina, et al.; "Bloom Filters and Count-Min Sketches with Some of Their Applications"; http://roguefort.di.unipi.it/~ferrax/Teach/InformationRetrieval/BFCM.pdf.

J. Aguilar Saborit, et al.; "Dynamic Count Filters"; SIGMOD Record; http://www.sigmod.org/sigmod/record/issues/0603/p26-article-pev.pdf; Mar. 1, 2006; pp. 26-32; vol. 35, No. 1.

Ahmed Metwally, et al.; "Duplicate Detection in Click Streams"; WWW 2005; http://www2005.org/cdrom/docs/p12.pdf; May 10-14, 2005; pp. 12-21; Chiba, Japan.

Saar Cohen, et al.; "Spectral Bloom Filters"; SIGMOD 2003; http://acm.org/sigmod/sigmod03/eproceedings/papers/r09p02.pdf; Jun. 9-12, 2003; pp. 241-252; San Diego, CA.

(Continued)

*Primary Examiner* — Mohammad Ali
*Assistant Examiner* — Bao G Tran
(74) *Attorney, Agent, or Firm* — Sughrue Mion, PLLC

(57) ABSTRACT

There is disclosed a system and method for executing multiple distinct aggregate queries. In an embodiment, the method comprises: providing at least one Counting Bloom Filter for each distinct column of an input data stream; reviewing count values in the at least one Counting Bloom Filter for the existence of duplicates in each distinct column; and if necessary, using a distinct hash operator to remove duplicates from each distinct column of the input data stream, thereby removing the need for replicating the input data stream and minimizing distinct hash operator processing. Also, the use of Counting Bloom Filters for monitoring data streams allow an early duplicate removal of the input stream of data, resulting in savings in computation time and memory resources.

12 Claims, 5 Drawing Sheets

OTHER PUBLICATIONS

Ryan Huebsch, et al.; "Sharing Aggregate Computation for Distributed Queries"; SIGMOD '07; http://delivery.acm.org/10.1145/1250000/1247535/p485-huebsch.pdf?key1=1247535&key2=5767967811&coll=&dl=GUIDE&CFID=15151515&CFTOKEN=6184618; Jun. 12-14, 2007; pp. 485-495; Beijing, China.

* cited by examiner

Build Phase

Probe Phase

SYSTEM AND METHOD FOR MULTIPLE DISTINCT AGGREGATE QUERIES

BACKGROUND

In typical database systems, users write, update, and retrieve information by submitting commands to a database application. To be correctly processed, the commands must comply with the database language that is supported by the database application. One popular database language is known as Structured Query Language (SQL), which may be used to code a Multiple Distinct Aggregate ("MDA") type query such as:

SELECT a1,
COUNT(DISTINCT(c1)), SUM(DISTINCT(c2)),
AVG(DISTINCT(c3))
FROM A
WHERE A.b>100
GROUP BY a1

As explained further below, MDA type queries may pose problems, particularly with respect to duplicate elimination during execution.

SUMMARY

The present invention relates to a system and method for MDA or multiple distinct aggregate type queries.

In an aspect, there is provided a data processor implemented method of executing multiple distinct aggregate type queries, comprising: providing at least one Counting Bloom Filter for each distinct column of an input data stream; reviewing count values in the at least one Counting Bloom Filter for the existence of duplicates in each distinct column; and if necessary, using a distinct hash operator to remove duplicates from each distinct column of the input data stream, thereby removing the need for replicating the input data stream and minimizing distinct hash operator processing.

In an embodiment, the method further comprises: in a build phase, during execution of a group by operation, creating for each group of tuples a Counting Bloom Filter for each distinct column; and in a probe phase, once the group by operation is finished, reviewing the count values in the Counting Bloom Filter for each distinct column, and if the count value for a distinct column is greater than one, then sending the identified duplicate values to the distinct hash operator.

In another embodiment, the method further comprises: in the build phase, when executing the group by operation, hashing the values of each distinct column into their respective Counting Bloom Filters; and incrementing the Counting Bloom Filter bit settings.

In another embodiment, in the probe phase, reviewing the count values in the Counting Bloom Filter comprises: for each tuple in a group, querying the values of the distinct columns in their respective Counting Bloom Filters; if the lowest of the counters for a given value is one, then determining that the value is unique, and passing the value to the aggregate operator and bypassing the distinct hash operator; probing a value into a distinct hash table if the value is not bypassed, and if a match is found, discarding the value; if a match is not found, turning the probing into an insertion; after finishing the processing of the tuples in group, traversing the distinct hash tables and flowing the distinct values up to the aggregate operator.

In another embodiment, the distinct hash operator comprises a set of hash tables, one per distinct column, and the method further comprises: sizing the hash table depending on an estimated number of distinct values per group, per distinct column, that are not bypassed to the aggregate operator; and if the estimated number of incoming distinct values for the next group is different, then resizing the hash table in dependence upon the estimated number.

In another embodiment, the estimated number is calculated by counting the number of values in the respective Counter Bloom Filters that are greater than one.

In another embodiment, the method further comprises providing a stop condition in the query execution plan in order to pass through the input data stream and perform a build phase.

In another embodiment, the method further comprises: in the absence of a group by operation having a stop condition, obtaining a cost decision based on estimations made by an optimizer, including avoiding the build phase such that all values are processed by the distinct hash operator; and introducing an additional stop condition in the query execution plan such that all of the input stream is passed over during the build phase.

In another aspect, there is provided a system for executing multiple distinct aggregate type queries, comprising: at least one Counting Bloom Filter for each distinct column of an input data stream; means for reviewing count values in the at least one Counting Bloom Filter for the existence of duplicates in each distinct column; and a distinct hash operator for removing duplicates, if necessary, from each distinct column of the input data stream, thereby removing the need for replicating the input data stream and minimizing distinct hash operator processing.

In an embodiment, the method further comprises: means for creating in a build phase, during execution of a group by operation, for each group of tuples, a Counting Bloom Filter for each distinct column; and means for reviewing in a probe phase, once the group by operation is finished, the count values in the Counting Bloom Filter for each distinct column, and if the count value for a distinct column is greater than one, then sending the identified duplicate values to the distinct hash operator.

In another embodiment, the system is adapted such that, in the build phase, when executing the group by operation, the values of each distinct column are hashed into their respective Counting Bloom Filters, and the Counting Bloom Filter bit settings are incremented.

In another embodiment, the system further comprises: means for querying the values of the distinct columns in their respective Counting Bloom Filters for each tuple in a group, and if the lowest of the counters for a given value is one, then determining that the value is unique, and passing the value to the aggregate operator and bypassing the distinct hash operator; means for probing a value into a hash table if the value is not bypassed, and if a match is found, discarding the value; if a match is not found, turning the probing into an insertion; means for traversing the hash tables after finishing the processing of the tuples in the group, and flowing the distinct values up to the aggregate operator.

In another embodiment, the distinct hash operator comprises a set of hash tables, one per distinct column, and the system further comprises: means for sizing the hash table depending on an estimated number of distinct values per group, per distinct column, that are not bypassed to the aggregate operator; and means for resizing the hash table in dependence upon the estimated number if the estimated number of incoming distinct values for the next group is different.

In another embodiment, the system is adapted to calculate the estimate number by counting the number of values in the respective Counter Bloom Filters that are greater than one.

In another embodiment, the system is further adapted to provide a stop condition in the query execution plan in order to pass through the input data stream and perform a build phase.

In another embodiment, the system further comprises: means for obtaining a cost decision based on estimations made by an optimizer in the absence of a group by operation having a stop condition, including avoiding the build phase such that all values are processed by the distinct hash operator; and means for introducing an additional stop condition in the query execution plan such that all of the input stream is passed over during the build phase.

In another aspect, there is provided a data processor readable medium storing data processor code that when loaded into a data processing device adapts the device to perform a method of executing multiple distinct aggregate type queries, the data processor readable medium comprising: code for providing at least one Counting Bloom Filter for each distinct column of an input data stream; code for reviewing count values in the at least one Counting Bloom Filter for the existence of duplicates in each distinct column; and code for using a distinct hash operator, if necessary, to remove duplicates from each distinct column of the input data stream, thereby removing the need for replicating the input data stream and minimizing distinct hash operator processing.

In an embodiment, the data processor readable medium further comprises: code for creating, in a build phase during execution of a group by operation, for each group of tuples, a Counting Bloom Filter for each distinct column; and code for reviewing, in a probe phase, once the group by operation is finished, the count values in the Counting Bloom Filter for each distinct column and sending the values to an aggregation operator after discarding duplicate values.

In an embodiment, the data processor readable medium further comprises: code for hashing, in the build phase, when executing the group by operation, the values of each distinct column into their respective Counting Bloom Filters, and incrementing the Counting Bloom Filter bit settings.

In an embodiment, the data processor readable medium further comprises: code for reviewing, in the probe phase, the count values in the Counting Bloom Filter; code for querying the values of the distinct columns in their respective Counting Bloom Filters for each tuple in a group, and if the lowest of the counters for a given value is one, then determining that the value is unique, and passing the value to the aggregate operator and bypassing the distinct hash operator; code for probing a value into a distinct hash table if the value is not bypassed, and if a match is found, discarding the value; if a match is not found, turning the probing into an insertion; code for traversing the distinct hash tables after finishing the processing of the tuples in the group, and flowing the distinct values up to the aggregate operator.

In another embodiment, the distinct hash operator comprises a set of hash tables, one per distinct column, and the data processor readable medium further comprises: code for sizing the hash table depending on an estimated number of distinct values per group, per distinct column, that are not bypassed to the aggregate operator; and code for resizing the hash table in dependence upon the estimated number if the estimated number of incoming distinct values for the next group is different.

In an embodiment, the data processor readable medium further comprises: code for calculating the estimated number by counting the number of values in the respective Counter Bloom Filters that are greater than one.

In an embodiment, the data processor readable medium further comprises: code for providing a stop condition in the query execution plan in order to pass through the input data stream and perform a build phase.

In an embodiment, the data processor readable medium further comprises: code for obtaining, in the absence of a group by operation having a stop condition, a cost decision based on estimations made by an optimizer, including avoiding the build phase such that all values are processed by the distinct hash operator; and code for introducing an additional stop condition in the query execution plan such that all of the input stream is passed over during the build phase. These and other aspects of the invention will become apparent from the following more particular descriptions of exemplary embodiments.

BRIEF DESCRIPTION OF THE DRAWINGS

In the figures which illustrate exemplary embodiments of the invention.

DETAILED DESCRIPTION

As noted above, the present invention relates to a system and method for duplicate elimination during the execution of MDA or multiple distinct aggregate type queries.

For clarity, the term "Counting Bloom Filter" or "CBF" is now defined. A CBF as described in "*Summary cache: a scalable wide-area Web cache sharing protocol*", IEEE Trans on Networking 2000 by L. Fan et. al. is an extension of the Bloom Filter data structure described in "*Space/Time Trade-offs in Hash Coding with Allowable Errors*", Communications of the ACM 1978 by Burton H. Bloom, where each bit of the bit-vector is substituted by a bit-counter. These documents are incorporated by reference herein in their entirety.

More generally, the CBF consists of a sequence of $C_1, C_2, \ldots, C_m$ bit-counters, which represents a total of n distinct values allowing for multiplicities. The total number of values represented is $M = n.\mu$, where $\mu$ is the average multiplicity factor. Similar to the original Bloom Filter, each time a new data element s has to be inserted in the set, d hash functions are used to update, at most, d entries or bit counters of the filter. While in the Bloom Filter the entries would be simply set to one, in CBF the counter in each of the d entries is incremented by one. In an analogous way, whenever a data element s is removed from the set, the counters in the same d entries of the filter are decremented by one. If all data elements in the set were inserted at once, the addition of all the counters would be equivalent to: $\Sigma_{j=1\ldots m} C_j = d \times M$. The usual representation of a CBF is a data structure where counters have a fixed size over time. Such a representation is the one used in an embodiment of the present invention.

Figure 1:
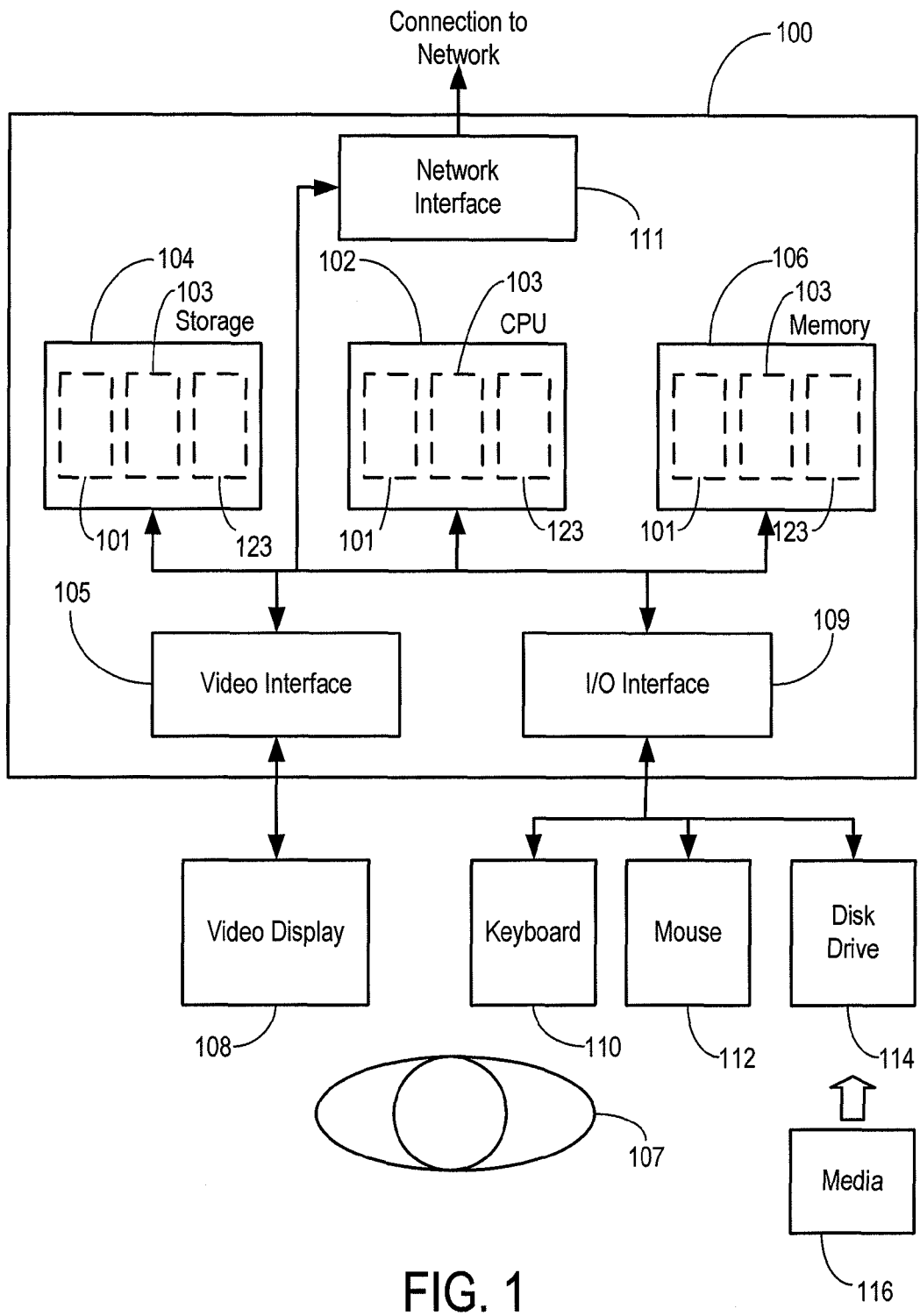
FIG. 1 shows a generic data processing system that may provide a suitable operating environment.

The invention may be practiced in various embodiments. A suitably configured data processing system, and associated communications networks, devices, software and firmware may provide a platform for enabling one or more embodiments. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface (GUI) controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

The problem of duplicate elimination in an MDA type query is now explained in more detail. When a SQL statement has MDA functions, then duplicate elimination turns into multiple sort operations, one per each distinct column. These sort operations cannot be executed in a pipelined manner since the lower sort operators in the query execution plan may eliminate values needed by the upper sort operators. Therefore, these type of queries have been handled by replicating the source stream of data into as many plan paths as there are distinct columns (i.e. splitting vertically), and then sorting each separate stream of data for duplicate removal.

Figure 2A:
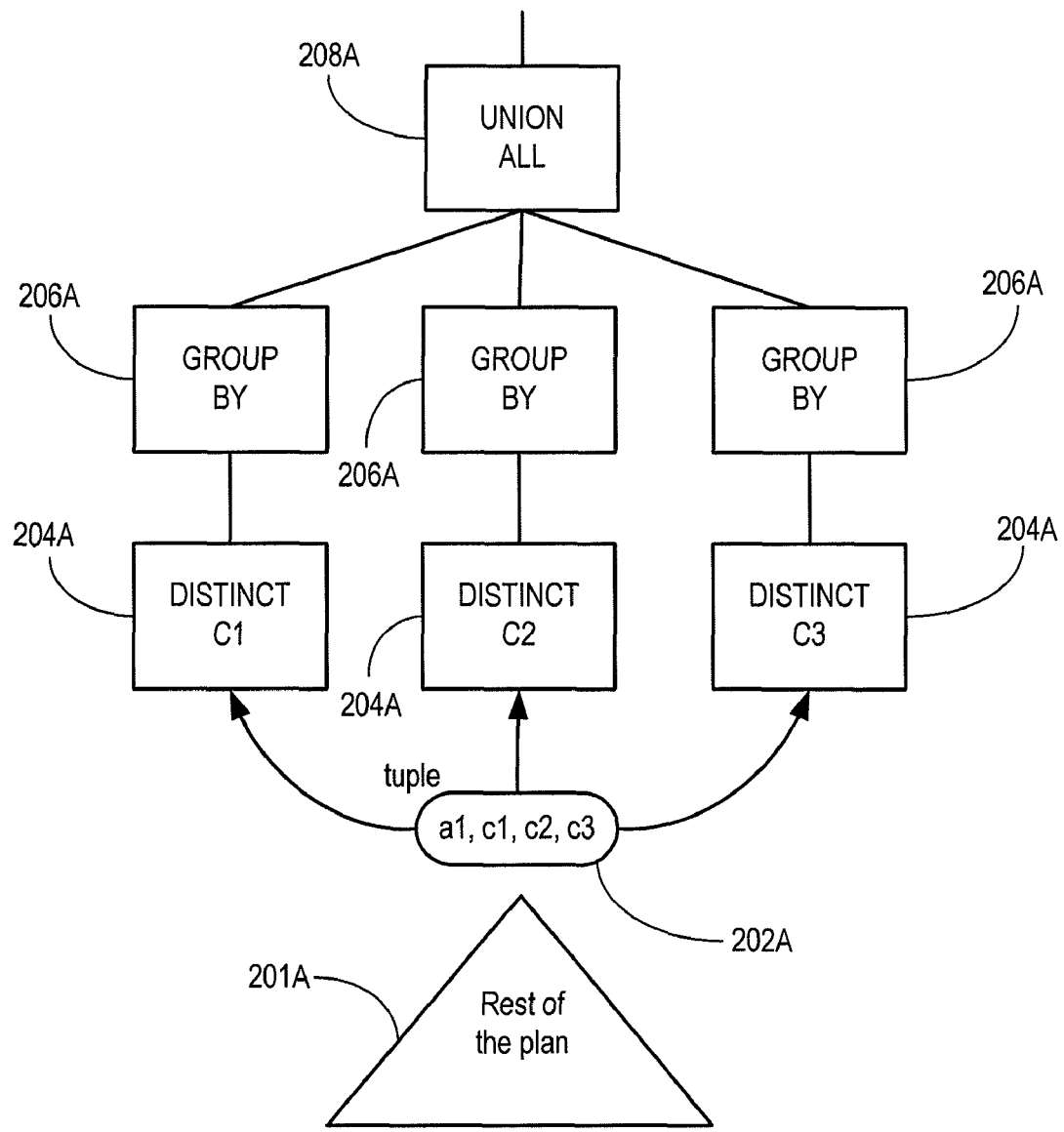
FIGS. 2A and 2B show schematic diagrams of ways in which MDA queries may be processed.

As an illustrative example of this, FIG. 2A shows the way IBM DB2 UDB™ processes MDA queries today: (i) either replicate the stream of data 202A for each distinct column 204A (i.e. c1, c2, c4), for a separate GROUP BY operation 206A for each column, with a subsequent union 208A as shown in FIG. 2A; or (ii) repeat the initial query processing itself once for each distinct column such that there are different independent streams of data. (See, for example, US Patent Application Publication No. 20040117356 entitled "Method and system for executing a query having multiple distinct key columns" by Chen, Yao-Ching et al., which is incorporated by reference herein in its entirety.)

Still referring to FIG. 2A, the "rest of the plan" 201A refers to a sub plan, or a sub tree containing the operations that generate the stream of data to be grouped by the group by column, or the stream of data to remove duplicates.

Figure 2B:
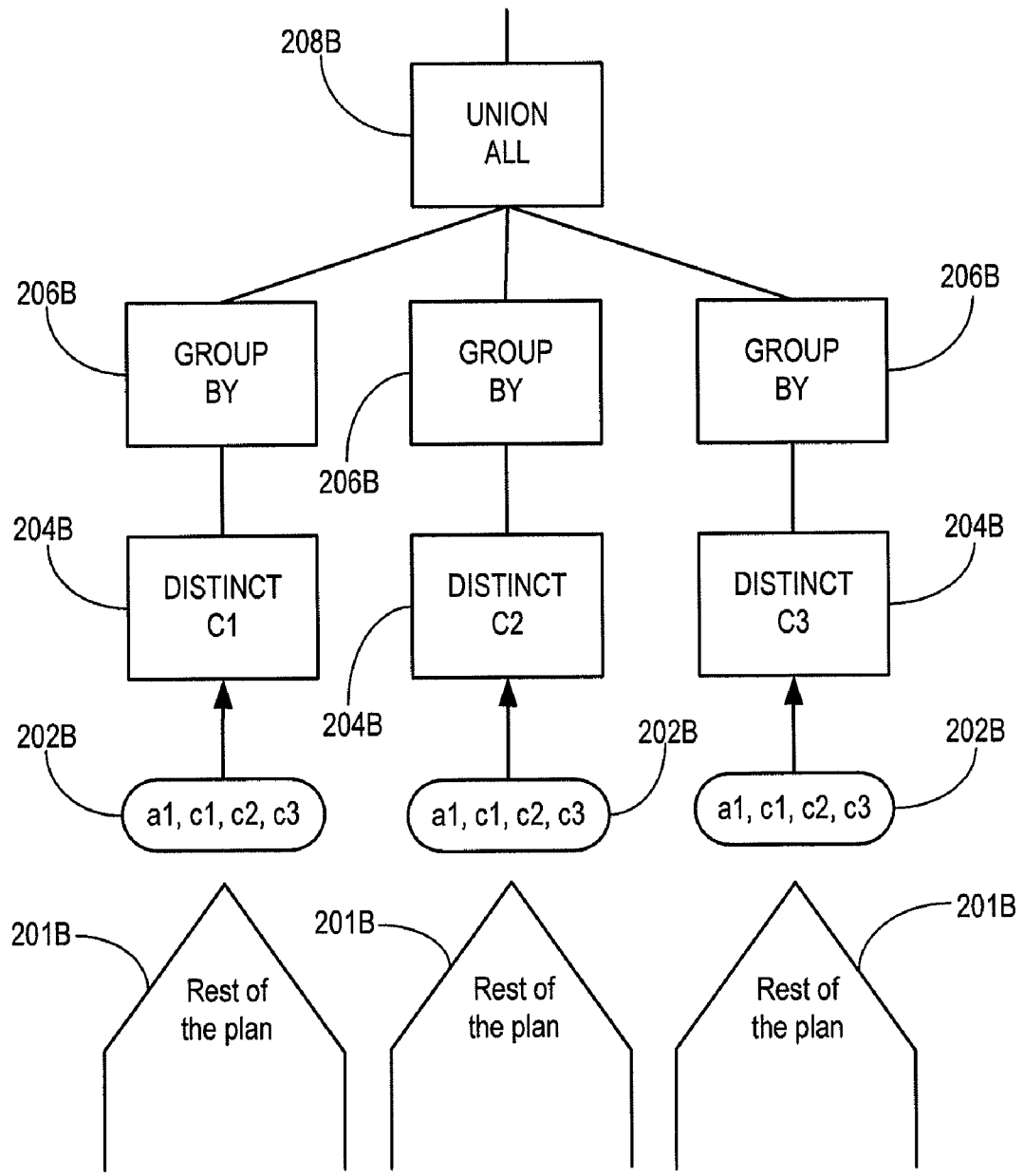

As another example as shown in FIG. 2B, in parallel environments, each replica of the original stream of data 202B can be executed in parallel, with each distinct column 204B undergoing a separate GROUP BY operation 206B, with a subsequent union 208B, alleviating some of the performance overhead with having multiple flows of data. The "rest of the plan" 201B again refers to a sub plan, or a sub tree containing the operations that generate the stream of data to be grouped by the group by column, or the stream of data to remove duplicates.

U.S. patent application Ser. No. 09/455,004 entitled "Parallel distinct aggregates" by Leo et. al. proposes a parallel method for MDAs. The method proposed in Leo et al. can be mapped to the type of processing from FIG. 2A. MDA queries are handled by sending the rows to be processed by as much process as there are distinct aggregates in the query. This first set of slave processes group the row pieces based on the <group-by value, distinct column>, and they perform a first stage of partial duplicate elimination. Then, rows are distributed to a second set of slave processes that complete the duplicate elimination and performs partial set function aggregation. A third stage completes the set aggregation to produce the results of the distinct aggregation operation. This method in Leo et al. improves parallelism and allows for scalability in parallel environments. However, replicating the source data stream, and doing similar processing of the same data stream, turns into very expensive query executions plans, causing MDA type queries to consume a large amount of resources in terms of CPU, I/O, and memory usage.

Based on the foregoing, it is desirable to provide a mechanism and technique for executing multiple distinct aggregate operations in a more efficient manner than currently available techniques.

To address the above identified problem, what is proposed is a new system and method for executing MDA type queries using a "group by" process. More generally, the method proposed is based on (1) a DISTINCT HASH operator that remove duplicates without the need for replicating the source data stream, and (2) a monitoring data structure such as Counting Bloom Filters that minimizes the processing in the DISTINCT HASH operator (e.g. as described in "*Summary cache: a scalable wide-area Web cache sharing protocol*", above).

The main advantages of the above describe approach are that the input data stream is not replicated, reducing the number of records to be processed proportionally to the number of distinct aggregates in the MDA query. Also, the use of Counting Bloom Filters for monitoring data streams allow an early duplicate removal of the input stream of data. Hence, we save computation time and memory resources. The method will now be described in more detail.

Figure 3:
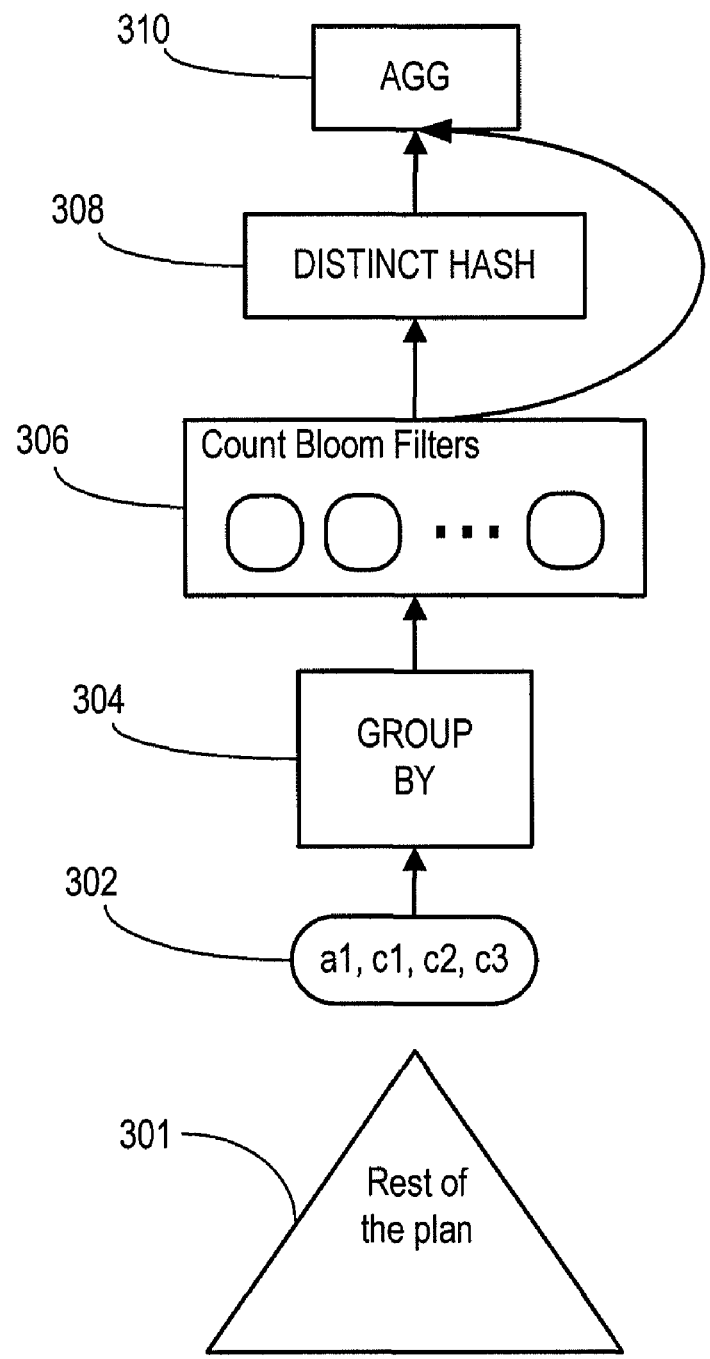
FIG. 3 shows a schematic block diagram of a system in accordance with an embodiment of the invention.

Now referring to FIG. 3, shown is a schematic block diagram of a process for performing duplicate removal in accordance with an embodiment. As shown, a set of Count Bloom Filters (CBF) 306 may be built while performing a GROUP BY operation 304 of data stream 302. More specifically, one CBF per distinct column is created per each group created during the GROUP BY operation at 304. Each CBF gives a succinct representation of the number of appearances of each value in the distinct columns for each group of tuples. Thus, for each group of tuples, its respective CBFs may detect unique values which are automatically passed on directly to the aggregate operator 310, bypassing the DISTINCT HASH operator 308. For other values for which respective entries in the CBF show that there may be a duplicate value, they are processed by the DISTINCT HASH operator at 308 prior to passing to the aggregate operator 310. This DISTINCT HASH operator 308 will remove the remaining duplicates, and send out the distinct values to the aggregate operator 310. This technique is now explained in more detail using a specific example.

Given a stream of data S, we give the following definitions:

GC, columns to apply the group by operation.

$DC=\{c_1, \ldots, c_n\}$, n columns to apply the distinct operations within each group.

$G_1, \ldots, G_g$, g groups of tuples result of grouping the stream S by the CG columns.

Using a process in accordance with the present invention, the solution consists of two steps, as described below.

First, in a Build Phase, during a GROUP BY operation, for each group of tuples $G_j$, a Counting Bloom Filter (CBF) is created for each distinct column in DC. Thus, there are g×n CBFs, each CBF consisting of a set of counters, with 2 bits per counter. Two bits per entry in the CBF is used to represent three states, namely: (a) the initial x'00' or 0 state indicating that if we hash to this location and the bits are x'00' this value is seen for the first time (b) a value of x'01' or 1 that is set when we have only one value hashed to this CBF location (c)

a value of x'10' or 2 that indicates that there could be duplicates for the values that hash to this location. Then, when executing the GROUP BY operation, for each tuple in a group $G_j$, we hash the values of each distinct column $c_i$ into their respective CBF, and increment the bit setting in the appropriate locations. As explained above, inserting a value in a CBF consists of applying d hash functions that map to, at most, d counters in the CBF that are incremented by one.

Second, in a Probe Phase, once the GROUP BY or a group within the stream is finished, then, for each group of tuples $G_j$, the appropriate values may be sent to the aggregation operator for each distinct column after discarding duplicate values. This is done by first looking at the information in the corresponding CBFs and using the DISTINCT HASH operator if necessary. The DISTINCT HASH operator consists of n hash tables, one per each distinct column $c_i$, hence, when necessary, the first appearance of a value of each distinct column is inserted within a group of tuples.

In more detail, for each tuple in a group $G_j$:
  (a) First query the values of the distinct columns in their respective CBFs. This way, if the lowest of the d counters for a given value is '01', then it can be determined that the value is unique, and the value may be passed to the aggregate operator bypassing the DISTINCT hash operator phase. Otherwise the value may be probed in its respective hash table.
  (b) To probe a value into the hash table turns into an insertion, only, if a match is not found. In case a match is found, the value is discarded. When finished the processing of a group of tuple $G_j$, then traverse the hash tables, and flow the distinct values up to the aggregate operator.

As used in the present disclosure, a distinct hash operator may be a set of hash tables, one per distinct column. Each hash table may be sized depending on the estimated number of distinct values per group, per distinct column, that are not bypassed to the aggregate operator. This estimation can be given either by an optimizer, or by counting the number of entries in the respective CBF that are greater than 1. Thus, when the processing of a group is finished, if the estimated number of incoming distinct values for the next group is different, then the hash table may need to be resized.

For a clearer understanding, taking the SQL query in the example of Section 1, and given the following input data stream S:

| a1 | c1 | c2 | c3 |
|----|----|----|----|
| a  | 1  | 2  | 1  |
| a  | 1  | 3  | 2  |
| c  | 2  | 1  | 2  |
| c  | 20 | 7  | 1  |
| b  | 3  | 1  | 2  |
| b  | 4  | 5  | 2  | then GC={a1}, DC={c1,c2,c3}. Then, after the group by operation:
  G1={{a,1,2,1} {a,1,3,2}},
  G2={{b,3,1,2} {b,4,5,2}}, and
  G3={{c,2,1,2}, {c,20,7,1}}.

Figure 4A:
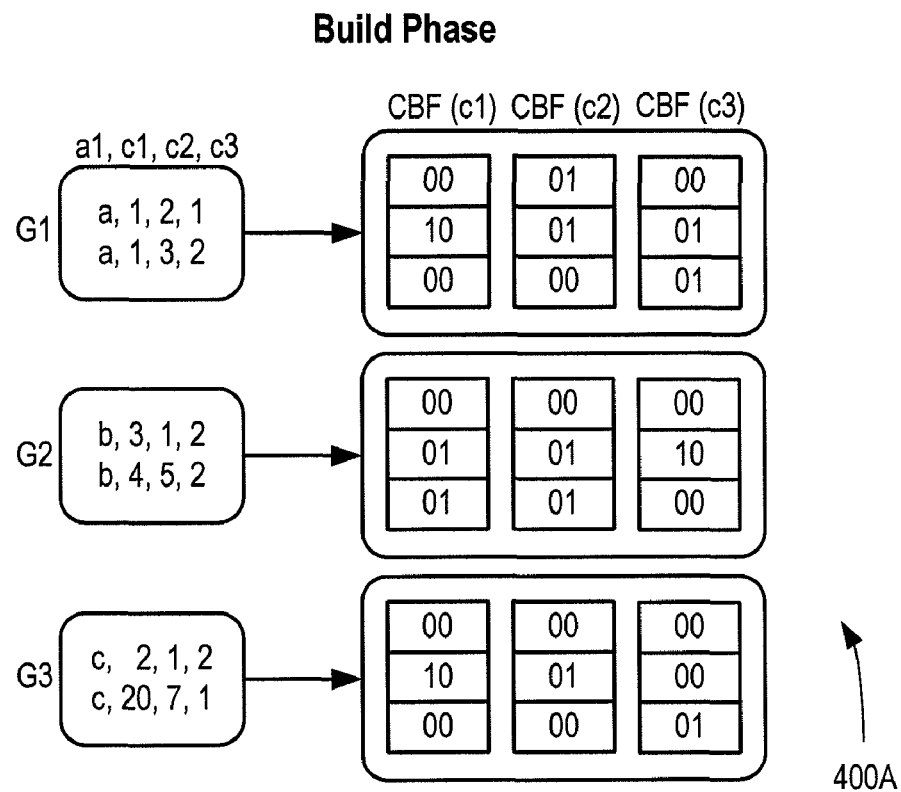
FIGS. 4A and 4B show schematic diagrams of an illustrative build phase for a set S using an embodiment of the invention.

FIG. 4A shows the result of the build phase for the set S defined above. For simplicity we only use one hash function d=1. As shown in FIG. 4A, there are three CBFs for each group of tuples, one for each distinct column (c1,c2,c3). As the first row in G1 is read, the c1 value is hashed to the second location in CBF(c1), and the value is incremented from x'00' to x'01'. Similarly CBF(c2) and CBF(c3) are updated. When the second row in G1 is considered, the value in c1 also hashes to the same location in CBF(c1) and increments the counter in CBF to x'10'. Note that once a state of x'10' is reached, it is not necessary to increment further. Notice that in set G3 a case of false positive for c1 is shown. In this case, 2 and 20 map the same position of the CBF which, for this case won't be able to detect they are unique values.

Figure 4B:
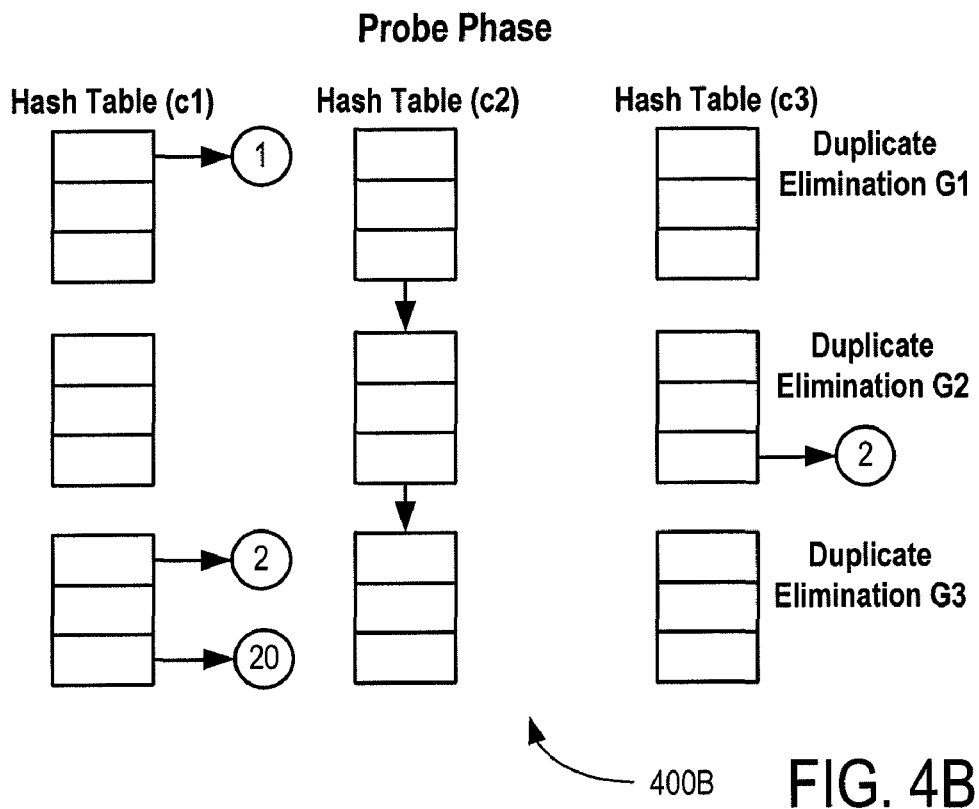

Now referring to FIG. 4B, during the probe phase for the set S defined above, it is possible to pass directly to the corresponding aggregate function all the values that have an entry of x'01' in the corresponding CBF location. It is only necessary to send values to be resolved by the HASH DISTINCT operator those entries that have x'10'. In this example, 1 is inserted from G1 in Hash Table (c1), 2 from G2 into Hash Table (c3), and {2, 20} from G3 in Hash Table (c1).

The methodology explained above requires a stop condition in the query execution plan in order to pass through all the input data stream and perform the build phase. In the present example, the stop condition was an already existing "group by" operation, thus additional work was not incurred. However it could be that either we do not have the "group by" condition, or that the grouping columns are already sorted, thus the stop condition does not exist anymore. In those cases, the algorithm can make a cost decision based on estimations made by an optimizer, including avoiding the build phase such that all values are processed by the HASH DISTINCT operator, and introducing an additional stop condition in the query execution plan such that we pass over all the input stream where we perform the build phase.

While various illustrative embodiments of the invention have been described above, it will be appreciated by those skilled in the art that variations and modifications may be made. For example, although the above description has focused on MDA type queries, the proposed invention is also beneficial for queries with only one distinct aggregate operation. In this case, compared to previous approaches, the main benefit resides in the early duplicate removal because of the use of Counting Bloom Filters.

Thus, the scope of the invention is defined by the following claims.

What is claimed is:

1. A data processor implemented method of executing multiple distinct aggregate type queries, comprising:
  providing at least one Counting Bloom Filter for each distinct column of an input data stream;
  reviewing count values in the at least one Counting Bloom Filter for the existence of duplicates in each distinct column;
  using a distinct hash operator to remove duplicates from each distinct column of the input data stream, thereby removing the need for replicating the input data stream and minimizing distinct hash operator processing;
  in a build phase, during execution of a group by operation, creating for each group of tuples a Counting Bloom Filter for each distinct column, hashing the values of each distinct column into their respective Counting Bloom Filters, and incrementing the Counting Bloom Filter bit settings; and
  in a probe phase, once the group by operation is finished, reviewing the count values in the Counting Bloom Filter for each distinct column, and if the count value for a distinct column is greater than one, then sending the identified duplicate values to the distinct hash operator,
  wherein in the probe phase, reviewing the count values in the Counting Bloom Filter comprises:
    for each tuple in a group, querying the values of the distinct columns in their respective Counting Bloom Filters;

when the lowest of the counters for a given value is one, then determining that the value is unique, and passing the value to the aggregate operator and bypassing the distinct hash operator;

probing a value into a distinct hash table if the value is not bypassed, and
    when a match is found, discarding the value;
    when a match is not found, turning the probing into an insertion;

after finishing the processing of the tuples in group, traversing the distinct hash tables and flowing the distinct values up to the aggregate operator, and wherein the distinct hash operator comprises a set of hash tables, one per distinct column, and the method further comprises:

sizing the hash table depending on an estimated number of distinct values per group, per distinct column, that are not bypassed to the aggregate operator; and when the estimated number of incoming distinct values for the next group is different, then resizing the hash table in dependence upon the estimated number.

2. The method of claim 1, wherein the estimated number is calculated by counting the number of values in the respective Counter Bloom Filters that are greater than one.

3. The method of claim 1, further comprising providing a stop condition in the query execution plan in order to pass through the input data stream and perform a build phase.

4. The method of claim 1, further comprising:

in the absence of a group by operation having a stop condition, obtaining a cost decision based on estimations made by an optimizer, including avoiding the build phase such that all values are processed by the distinct hash operator; and introducing an additional stop condition in the query execution plan such that all of the input stream is passed over during the build phase.

5. A system for executing multiple distinct aggregate type queries, comprising:

at least one Counting Bloom Filter for each distinct column of an input data stream;

means for reviewing count values in the at least one Counting Bloom Filter for the existence of duplicates in each distinct column;

a distinct hash operator for removing duplicates, from each distinct column of the input data stream, thereby removing the need for replicating the input data stream and minimizing distinct hash operator processing, means for creating in a build phase, during execution of a group by operation, for each group of tuples, a Counting Bloom Filter for each distinct column;

means for reviewing in a probe phase, once the group by operation is finished, the count values in the Counting Bloom Filter for each distinct column, and if the count value for a distinct column is greater than one, then sending the identified duplicate values to the distinct hash operator;

wherein the system is adapted such that, in the build phase, when executing the group by operation, the values of each distinct column are hashed into their respective Counting Bloom Filters, and the Counting Bloom Filter bit settings are incremented;

the system further comprising:

means for querying the values of the distinct columns in their respective Counting Bloom Filters for each tuple in a group, and when the lowest of the counters for a given value is one, then determining that the value is unique, and passing the value to the aggregate operator and bypassing the distinct hash operator;

means for probing a value into a hash table if the value is not bypassed, and
    when a match is found, discarding the value;
    when a match is not found, turning the probing into an insertion;

means for traversing the hash tables after finishing the processing of the tuples in group, and flowing the distinct values up to the aggregate operator, wherein the distinct hash operator comprises a set of hash tables, one per distinct column, and the system further comprises:

means for sizing the hash table depending on an estimated number of distinct values per group, per distinct column, that are not bypassed to the aggregate operator; and means for resizing the hash table in dependence upon the estimated number when the estimated number of incoming distinct values for the next group is different.

6. The system of claim 5, wherein the system is adapted to calculate the estimate number by counting the number of values in the respective Counter Bloom Filters that are greater than one.

7. The system of claim 5, further comprising providing a stop condition in the query execution plan in order to pass through the input data stream and perform a build phase.

8. The system of claim 5, further comprising:

means for obtaining a cost decision based on estimations made by an optimizer in the absence of a group by operation having a stop condition, including avoiding the build phase such that all values are processed by the distinct hash operator; and means for introducing an additional stop condition in the query execution plan such that all of the input stream is passed over during the build phase.

9. A data processor readable medium storing data processor code that when loaded into a data processing device adapts the device to perform a method of executing multiple distinct aggregate type queries, the data processor readable medium comprising:

code for providing at least one Counting Bloom Filter for each distinct column of an input data stream;

code for reviewing count values in the at least one Counting Bloom Filter for the existence of duplicates in each distinct column;

code for using a distinct hash operator to remove duplicates from each distinct column of the input data stream, thereby removing the need for replicating the input data stream and minimizing distinct hash operator processing;

code for creating, in a build phase during execution of a group by operation, for each group of tuples, a Counting Bloom Filter for each distinct column;

code for reviewing, in a probe phase, once the group by operation is finished, the count values in the Counting Bloom Filter for each distinct column and sending the values to an aggregation operator after discarding duplicate values;

code for hashing in the build phase, when executing the group by operation, the values of each distinct column into their respective Counting Bloom Filters, and incrementing the Counting Bloom Filter bit settings;

code for reviewing, in the probe phase, the count values in the Counting Bloom Filter;

code for querying the values of the distinct columns in their respective Counting Bloom Filters for each tuple in a group, and when the lowest of the counters for a given value is one, then determining that the value is unique, and passing the value to the aggregate operator and bypassing the distinct hash operator;

code for probing a value into a distinct hash table if the value is not bypassed, and when a match is found, discarding the value;

when a match is not found, turning the probing into an insertion;

code for traversing the distinct hash tables after finishing the processing of the tuples in group, and flowing the distinct values up to the aggregate operator, wherein the distinct hash operator comprises a set of hash tables, one per distinct column, and the data processor readable medium further comprises:

code for sizing the hash table depending on an estimated number of distinct values per group, per distinct column, that are not bypassed to the aggregate operator; and code for resizing the hash table in dependence upon the estimated number when the estimated number of incoming distinct values for the next group is different.

10. The data processor readable medium of claim 9, further comprising code for calculating the estimated number by counting the number of values in the respective Counter Bloom Filters that are greater than one.

11. The data processor readable medium of claim 9, further comprising code for providing a stop condition in the query execution plan in order to pass through the input data stream and perform a build phase.

12. The data processor readable medium of claim 9, further comprising:

code for obtaining, in the absence of a group by operation having a stop condition, a cost decision based on estimations made by an optimizer, including avoiding the build phase such that all values are processed by the distinct hash operator; and code for introducing an additional stop condition in the query execution plan such that all of the input stream is passed over during the build phase.

* * * * *